United States Patent [19]

Chang

[11] Patent Number: 5,214,574
[45] Date of Patent: May 25, 1993

[54] PORTABLE COMPUTER HOUSING IN COMBINATION WITH A PORTABLE COMPUTER

[76] Inventor: Bo E. Chang, 22 Yearling Ct., Rockville, Md. 20850

[21] Appl. No.: 868,837

[22] Filed: Apr. 16, 1992

[51] Int. Cl.⁵ .................... H05K 5/00; A45C 11/00; B85D 85/38; B41D 11/56
[52] U.S. Cl. .................... 361/393; 361/390; D3/76; 190/102; 206/305; 206/320; 206/523; 206/576; 400/685; 400/691; 312/208.4
[58] Field of Search .................... D3/30.1, 76, 78; D28/84; 190/1, 102, 900, 901; 206/305, 320, 523, 576; 400/685, 691; 312/208.4, 223.2, 223.1; 364/708; 361/380, 390, 391, 392, 393, 394, 395, 399

[56] References Cited

U.S. PATENT DOCUMENTS

| | | | |
|---|---|---|---|
| 4,294,496 | 10/1981 | Murez | 400/685 X |
| 4,736,332 | 4/1988 | Crease | 364/708 |
| 4,790,431 | 12/1988 | Reel et al. | 361/394 X |
| 4,837,590 | 6/1989 | Sprague | 346/145 |
| 4,839,837 | 6/1989 | Chang | 364/708 |
| 5,060,152 | 10/1991 | Mauser | 364/708 X |
| 5,074,413 | 12/1991 | Ikuta et al. | 206/320 |

OTHER PUBLICATIONS

IBM Technical Disclosure Bulletin, vol. 20, No. 2, Jul. 1972, pp. 724 and 725, "Self-Storing Retainer for Electronics Package", Cimijotti and Johnson.

Primary Examiner—Leo P. Picard
Assistant Examiner—Michael W. Phillips
Attorney, Agent, or Firm—Richard C. Litman

[57] ABSTRACT

A protective housing for portable computers includes first and second shells defining trays of disparate depths and rear walls of similar height and hingedly connected together. With side and front walls of the first shell defining a minimal height generally not exceeding the height of a CPU/keyboard unit closely confined within the first shell tray, a user has un-impeded access to the keyboard while opening(s) in one or more walls of the first shell overlie access to various drives and/or ports adapted to communicate with external peripheral devices. Higher side and front walls on the second shell define a tray of greater depth and within which is disposed a portable printer having a cable directly communicating with the CPU in the first shell.

16 Claims, 2 Drawing Sheets

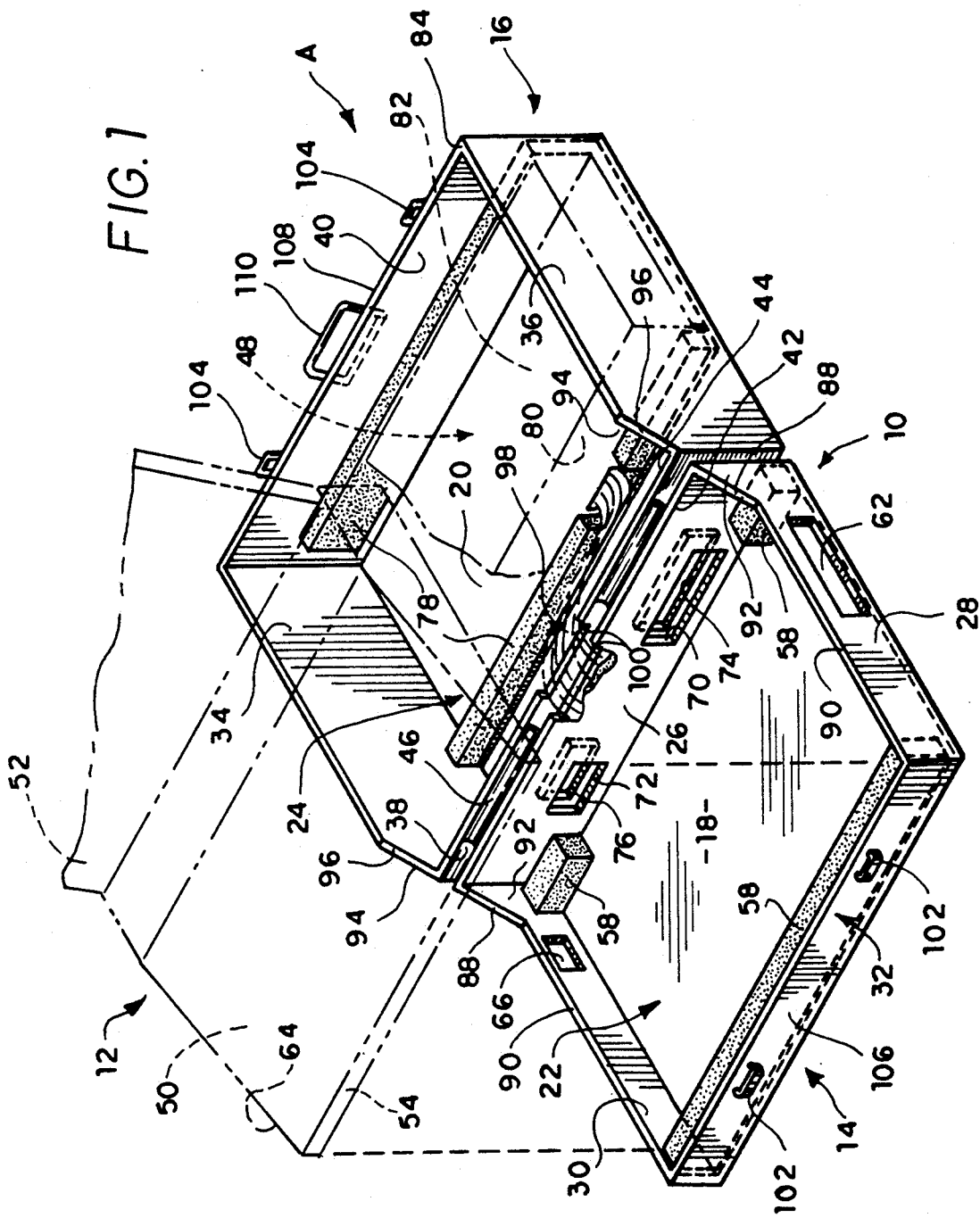

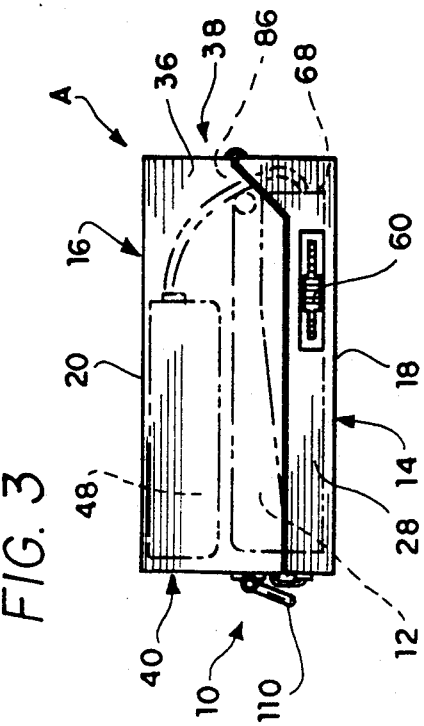
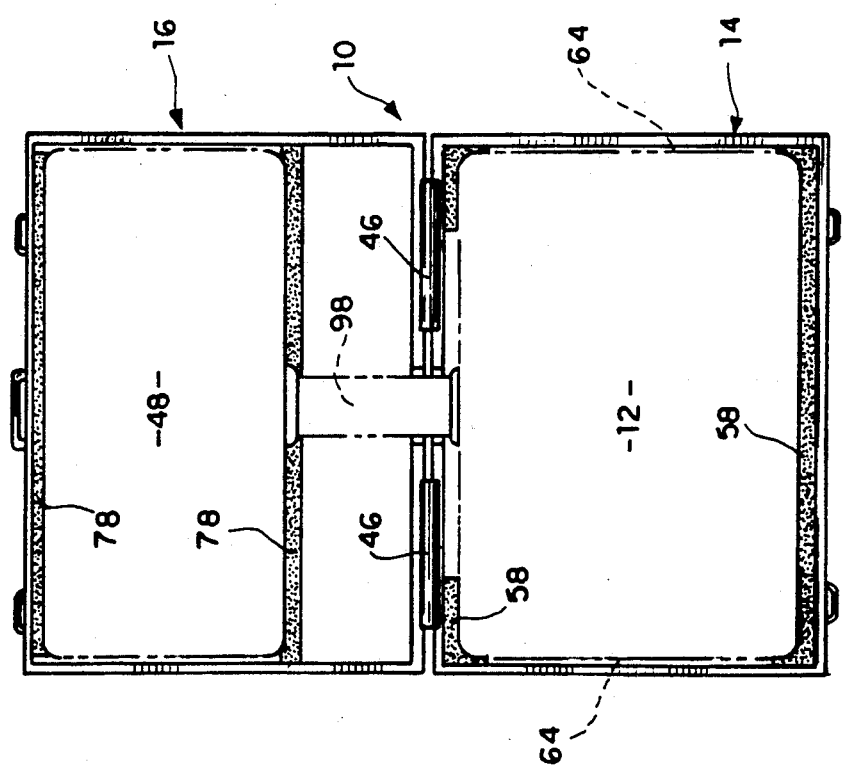

PORTABLE COMPUTER HOUSING IN COMBINATION WITH A PORTABLE COMPUTER

FIELD OF THE INVENTION

This invention relates generally to computer accessories and more particularly, to an improved casing or housing assembly especially constructed to accommodate a multi-component portable computer, such as a laptop or notebook computer.

BACKGROUND OF THE INVENTION

Personal computers have been in popular use for many years and comprise a relatively bulky CPU, an equally massive separate display unit or monitor and a third, separate keyboard component. Such assemblies are frequently referred to as desktop computers and usually require over two square feet of supportive surface, even with the monitor mounted atop the CPU.

With the development of more sophisticated components, including more miniaturized digital circuitry, smaller data storage devices and flat-screen LCD displays, a generation of portable computers evolved and wherein all three basic computer components were offered in a transportable assemblage. Initially, some of these latter computers were suitcase sized and offered little true portability over that of current desktop PCs. During the past five years, the portable computers have advanced to true portability and are now referred to as laptop computers. Even so, these devices can present an awkward situation for the traveling user as they comprise another, separate assembly to transport. Now, the latest generation comprises the notebook computer which is extremely compact and usually comprises an integral CPU and keyboard component, to which is pivotally attached, as a cover, the display or monitor component. When closed, this assembly presents a thickness of less than two inches and lateral dimensions of less than twelve inches. Such an arrangement presents the ultimate in portability with its compact nature permitting of transport within a small briefcase or portfolio.

The need exists for protective means to encase the above portable computers, particularly the notebook models. This not only would provide a more positive grasping element for carrying the unit but also would allow for the concurrent transport and usage of a peripheral computer component, such as a portable printer, stored, transported and used within but a single case or housing. In this manner, added protection against damage is provided to all of the computer components both while in transport and while in use, since the various components remain in place within the casing halves when it is opened and being used.

DESCRIPTION OF THE RELATED ART

Examples of portable computers associated with constructions facilitating the transport thereof will be found in the prior art. My earlier U.S. Pat. No. 4,839,837, issued on Jun. 13, 1989, teaches the concept of combining a portable CPU, monitor and printer into a unified assembly and wherein the three pivotally joined components when folded, provide an un-encased unit ready for transport. No supplemental protective housing for the components is shown. Additionally, U.S. Pat. No. 4,837,590 issued on Jun. 6, 1989 to Sprague, illustrates the broad concept of the combination of a laptop computer and a portable printer adapted to be housed within a carrying case. In this latter instance, the carrying case is akin to a suitcase within which are disposed a computer, printer, modem and telephone along with compartments for printer paper and personal papers and thus presents a rather sizable parcel far divorced from the normal dimensions of the portable computer itself.

SUMMARY OF THE INVENTION

By the present invention, an improved portable computer housing is presented and which provides a supplemental protective case comprising two pivotally joined shells closely enshrouding the overall dimensions of the computer components adapted to be contained therein. The housing is configured to accommodate the CPU and attached display unit within one shell having walls constructed to allow unimpeded access to and use of the computer while contained within the housing. This includes access to any floppy drives, switches and ports. Additionally, a portable printer is adapted to be mounted within the other shell and closely nests with the CPU when the housing is closed. Shock-resistant means serve to retain the computer components within the respective shell portions.

Accordingly, one of the objects of the present invention is to provide an improved computer assembly including a housing having two pivotally attached shells respectively closely enshrouding a portable computer and a printer.

Another object of the present invention is to provide an improved computer assembly including a two-shell housing with one shell adapted to closely enshroud a portable computer CPU and display and having peripheral walls configured to permit unimpeded access to a keyboard integral with the CPU, with the other shell adapted to closely enshroud a portable printer and having peripheral walls configured to mate with those of the first shell to provide a compact rectangular housing when the shells are closed for transport and storage.

Still another object of the present invention is to provide an improved computer assembly including a protective housing having two pivotally joined shells each adapted to closely enshroud components of a portable computer and having peripheral walls allowing of access to floppy drives and the like such that the computer is not only transportable in the housing but also fully usable while remaining therein and without impediment to accessing its keyboard and peripheral devices.

With these and other objects in view which will more readily appear as the nature of the invention is better understood, the invention consists in the novel construction, combination and assembly of parts hereinafter more fully described, illustrated and claimed with reference being made to the attached drawings.

BRIEF DESCRIPTION OF THE DRAWINGS

FIG. 1 is a perspective view of the computer housing assembly according to the present invention;

FIG. 2 is a side elevation of the structure of FIG. 1 shown with the portable computer in its use position;

FIG. 3 is a rear elevation illustrating the assembly in a closed position as when transported and stored; and FIG. 4 is a top plan view.

Similar reference characters designate corresponding parts throughout the several figures of the drawings.

DESCRIPTION OF THE PREFERRED EMBODIMENT

Referring now to the drawings, particularly FIG. 1, the present invention will be seen to comprise an assembly A including a housing or casing 10 and associated portable computer 12. The housing 10 is formed by a first and second shell or section 14 and 16, respectively, each having a generally rectangular base wall 18,20. Each shell 14,16 presents a tray or cavity 22,24 adapted to house specific computer components.

The first shell tray 22 includes the base wall 18 and four peripheral walls comprising a rear wall 26, side walls 28,30 and a front wall 32 while the second shell tray 24 is formed by the base wall 20 and its attached rear wall 38, side walls 34,36 and front wall 40. The material selected for the casing may be of any suitable lightweight, impact-resistant composition, such as aluminum or plastics.

The two shells 14,16 are hingedly attached to one another to provide a pivot axis adjacent the top edges 42,44. A piano hinge may be employed in the case of a metallic assembly while a plastics composition lends itself to the use of an integral or live hinge 46 as shown in the drawings. The various walls of the two shells are constructed in a manner permitting of the use of a computer 12 and an associated peripheral device, such as a printer 48. The first shell tray 22 will be understood to accommodate a portable computer 12, particularly of the laptop or notebook type and wherein the computer 12 includes an integrated CPU/keyboard unit (which is to be hereinafter understood to encompass a combined unit comprising a CPU and a keyboard) 50 to which is pivotally attached a display unit or monitor 52, swingable from an opened, use position as in FIGS. 1 and 2, to a closed, travel position as in FIGS. 3 and 4. The configuration of most computers 12 of the present category includes a front edge 54 of minimal height and from which the keyboard slopes upwardly toward the rear pivot 56 of the display unit 52. To accommodate this normal keyboard disposition when the computer 12 is nested within the tray 22, the first shell front wall 32 and a substantial length of the side walls 28,30 rearwardly therefrom, are of a lesser height than the rear wall 26. With this construction, with the computer 12 housed within the first shell 14, the top surface of the keyboard unit 50 will be seen from FIG. 2 to be fully accessible and without lateral encumbrances so that a user's hands will not be impeded during operation of the keyboard.

To protectively retain the CPU/keyboard unit 50 within the tray 22 in a closely fitting manner, suitable means such as one or more cushion elements 58, preferably adjacent the corners of the shell 14, enable a firm pressure-resistant retention of the computer as it is inserted into the tray 22 and partly compresses the elements 58, as depicted in the plan view of FIG. 4. When thusly installed, the computer 12 is fully functional upon opening of the assembly A and thence opening of the display unit 52 as shown in FIG. 2 of the drawings. To permit access to and use of internal floppy disc drive(s) 60 located within the computer 12, an opening 62 is provided through the wall of the shell 14, immediately overlying each such disc drive access. Usually, these floppy drives are accessible on one of the sides 64,64 of the CPU 50 and accordingly, the shell opening 62 will be located in the juxtaposed shell side wall 28 or 30. Other openings like the accessory opening 66 in the side wall 30 are provided to permit direct access to other CPU devices such as a plug (not shown) for receiving an external power supply or battery charger.

Most CPU's are provided with one or more serial/parallel ports which are usually located on the back 68 and to allow for access thereto. Similarly configured openings 70,72 are provided in the first shell rear wall 26, with these openings overlying the respective ports on the CPU so that uninhibited attachment of appropriate cable connectors may be made according to the user's needs, as for an external peripheral device. Contiguous openings 74,76 are provided in the rear wall 38 of the second shell 16 so that when the assembly A is opened with the two base walls 18,20 coplanar, the openings 74,76 are juxtaposed the first shell openings 70,72 respectively, to permit passage of desired cables either between opposed ones of the openings or, from either of the openings to an external device.

The second shell 16 is intended to house a peripheral device as used by the computer 12, such as the portable printer 48 which is retained within the second shell tray 24 by similar resilient retention elements 78, preferable located to secure the printer contiguous with the shell front wall 40 so that the printer front wall 80 is located well spaced from the second shell rear wall 38. With this arrangement and with the top wall 82 of the printer disposed well below the top edges 84 of the second shell peripheral walls 34,36,38,40, it will be seen that when the assembly A is closed, as in FIG. 3, the greater or extended height of the second shell peripheral walls 34,36,40 provides a clear area 86 atop the printer 48 and which serves to accommodate the height of the CPU/keyboard unit 50 within the first shell tray 22. This disparity between the side wall heights and vertical capacity of the two shells, while both shells exhibit a rear wall of similar height, is due to the first shell offset side wall edges 88,88 inclined upwardly from the side wall edges 90,90 to the top edge 42 of the rear wall 26. The resultant offset or raised side wall segments 92,92 will be seen to mate with the cut-outs 94,94 as formed on the second shell side walls 34,36 by the edges 96,96 sloping downwardly from the side wall top edges 84 to the rear wall top edge 44. As the inclined edges 88 and 96 are each disposed 45 degrees relative the horizontal edges 90 and 84, it follows that when the assembly A is opened as in FIGS. 1 and 2, these inclined edges from a straight line and will mate for a closed fit when the shells are closed as in FIG. 3.

As an alternative to using the openings 70,72,74,76 for the passage of cabling between the two shells 14,16, for interconnecting the printer 48 and CPU/keyboard unit 50, a cable 98 may communicate between the two components by passing it over the top edges 42,44 of the shell rear wall 26,38 as shown most clearly in FIGS. 1, 2 and 4. A flat ribbon cable 98 may most readily be passed over the rear walls without adding noticeable bulk to the assembly and notches 100 for receiving the cable 98 may be provided in the wall edges 42,44 to improve the flush disposition of all of the components.

It will be appreciated that distinctive configurations of various computers may call for the assembly shells 14,16 to be constructed with peripheral walls of shapes or relative dimensions which are altered from those as illustrated herein. Likewise, the reference hereinabove to ports will be understood to broadly encompass any well known hardware fixture as utilized on computer components, such as drive doors, switches, serial or parallel cable fittings, etc.

To secure the housing shells in the closed condition and to allow for its convenient transport, matching latch components 102,104 are respectively mounted on the outer faces 106,108 of the two front walls 32,40 and a handle 110 is pivotally mounted upon the outer face 108 of the second shell front wall 40.

From the foregoing it will be appreciated that an improved housing for the protective storage, transport and usage of a portable computer assembly is disclosed and which allows operation of all components of a laptop or notebook type of computer, including floppy disc drives, while retained with the closely fitting housing while optionally permitting the attachment of alternate peripheral devices.

It is to be understood that the present invention is not limited to the sole embodiment described above, but encompasses any and all embodiments within the scope of the following claims.

I claim:

1. A portable computer housing assembly in combination with a portable computer unit including:
    first and second substantially rectangular shells each having a base wall joined to a rear, front and two side walls and defining a tray therewithin;
    hinge means pivotally connecting said first and second shell rear walls, whereby said hinge means enable said first and second shells to open such that said second shell will lie coplanar with said first shell;
    a dual-component portable computer unit having a lateral periphery closely confined within said tray of said first shell and including a lowermost CPU component having an integral keyboard and being joined to a display component attached thereto for transition between a generally horizontal closed position overlying said keyboard to an upwardly inclined position adjacent said first shell rear wall;
    said CPU component having a port accessible on the periphery thereof adjacent one said wall of said first shell;
    said one said wall being provided with an opening overlying said port to allow access thereto with said portable computer unit confined within said first shell;
    said front and side walls of said first shell being of a lesser height than said front and side walls of said second shell, and permitting unimpeded access to said keyboard by a user'hands;
    an additional component comprising an external computer peripheral device closely confined within said second shell tray and having a top surface disposed below the height of sad second shell front and side walls to define a substantial clearance thereatop and below the height of said second shell front and side walls; and
    means defining at least one passageway being disposed between said first and second shell trays accepting cable means communicating between said CPU component and said peripheral device, whereby upon closure of said first and second shells about said hinge means, said walls of said first shell are contiguous respective said walls of said second shell, thereby to provide a housing fully enclosing said CPU/keyboard component and said display component, with said display component being at least partially disposed within the confines of said substantial clearance.

2. The portable computer housing assembly in combination with the portable computer unit according to claim 1, wherein said portable computer unit comprises a laptop computer.

3. The portable computer housing assembly in combination with the portable computer unit according to claim 1, wherein said portable computer unit comprises a notebook computer.

4. The portable computer housing assembly in combination with the portable computer unit according to claim 1, including:
    retention means being disposed in said first and second shell trays respectively engaging and retaining said CPU/keyboard component and said peripheral device.

5. The portable computer housing assembly in combination with the portable computer unit according to claim 4, wherein said retention means includes compressible resilient elements.

6. The portable computer housing assembly in combination with the portable computer unit according to claim 1, wherein said first shell side walls each include an enlarged segment providing a rearwardly and upwardly sloping top edge adjacent first shell rear wall; and
    said second shell side walls each include a cut-out segment defined by an inclined top edge adjacent said second shell rear wall.

7. The portable computer housing assembly in combination with the portable computer unit according to claim 6, wherein said first and second shell rear walls define a substantially equal height.

8. The portable computer housing assembly in combination with the portable computer unit according to claim 1, wherein said shells comprise a plastic composition; and
    said hinge means includes a live hinge.

9. The portable computer housing assembly in combination with the portable computer unit according to claim 1, wherein said second shell front wall is of a substantially greater height than said first shell front wall.

10. The portable computer housing assembly in combination with the portable computer unit according to claim 1, wherein said first and second shell rear walls are of a substantially equal height.

11. The portable computer housing assembly in combination with the portable computer unit according to claim 1, including:
    cooperating latch means being attached to said first and second shell front walls; and
    handle means being attached to said second shell front wall.

12. The portable computer housing assembly in combination with the portable computer unit according to claim 1, wherein said external computer peripheral device includes a printer.

13. The portable computer housing assembly in combination with the portable computer unit according to claim 1, wherein said port on said CPU component is connected to a floppy drive.

14. The portable computer housing assembly in combination with the portable computer unit according to claim 1, wherein said keyboard is inclined downwardly toward said first shell front wall.

15. The portable computer housing assembly in combination with the portable computer including:

first and second substantially rectangular shells each having a base wall joined to a rear, front and two side walls, and defining a tray therewithin;

hinge means pivotally connecting said first and second shell rear walls;

a dual-component portable computer unit having a lateral periphery closely confined with said tray of said first shell and including a lowermost CPU component having an integral keyboard and being joined to a display component attached thereto for displacement between a generally horizontal closed position overlying said keyboard to an upwardly inclined position adjacent said first shell rear wall;

said CPU component having a port accessible on the periphery thereof adjacent one said wall of said first shell;

said one said wall being provided with an opening overlying said port to allow access thereto with said portable computer unit confined within said first shell;

said front and side walls of said first shell being of a lesser height than said front and side walls of said second shell and permitting unimpeded access to said keyboard by a user's hands;

an additional component comprising an external computer peripheral device closely confined within said second shell tray and having a top surface disposed below the height of said second shell front and side walls to define a substantial clearance thereatop, and below the height of sad second shell front and side walls;

passageway means between said first and second shell trays accepting cable means communicating between said CPU component and said peripheral device, whereby upon closure of said first and second shells about said hinge means, said walls of said first shell are contiguous respective said walls of said second shell, thus to provide a housing fully enclosing said CPU/keyboard unit and said external peripheral device with said display component at least partially disposed within the confines of said substantial clearance; and said first and second shell rear walls each include a passageway, whereby upon opening of said shells to position said first and second shell base walls substantially parallel and juxtaposed with said passageways horizontally aligned with one another.

16. A portable computer housing assembly for coupling together multiple components of a multi-component portable computer in combination with a portable computer comprising:

first and second substantially rectangular shells each having a plurality of peripheral walls;

means hingedly attaching said shells together and permitting transition thereof between an open coplanar position to a closed stacked position;

a portable computer including a first component having a lateral periphery closely confined within said first shell;

a port on said periphery;

at least one said first shell peripheral wall having an opening therein overlying said port;

said portable computer including a second component closely confined within said second shell;

flexible data transmission means communicating between said first and second components, whereby said two components are fully accessible for manipulation thereof while being confined within said shells when in said open position and upon rotation of said firs and second shells about said hinge means to said closed position said walls of said first shell are contiguous and coplanar respective said walls of said second shell, thus to provide a housing fully enclosing said first and second components.

* * * * *